US012634519B2

(12) United States Patent
Ichigaya et al.

(10) Patent No.: US 12,634,519 B2
(45) Date of Patent: *May 19, 2026

(54) LUMINANCE DEBLOCK FILTERING ENCODING DEVICE, DECODING DEVICE, AND PROGRAM

(71) Applicant: NIPPON HOSO KYOKAI, Tokyo (JP)

(72) Inventors: Atsuro Ichigaya, Tokyo (JP);
Shunsuke Iwamura, Tokyo (JP);
Shimpei Nemoto, Tokyo (JP);
Kazuhisa Iguchi, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,128

(22) Filed: Sep. 10, 2024

(65) Prior Publication Data

US 2024/0430481 A1     Dec. 26, 2024

Related U.S. Application Data

(63) Continuation of application No. 18/344,306, filed on Jun. 29, 2023, now Pat. No. 12,120,350, which is a
(Continued)

(30) Foreign Application Priority Data

Oct. 22, 2018     (JP) ................................. 2018-198728

(51) Int. Cl.
*H04N 19/60* (2014.01)
*H04N 19/117* (2014.01)
(Continued)

(52) U.S. Cl.
CPC ........... *H04N 19/60* (2014.11); *H04N 19/117* (2014.11); *H04N 19/124* (2014.11); *H04N 19/172* (2014.11); *H04N 19/91* (2014.11)

(58) Field of Classification Search
None
See application file for complete search history.

(56) References Cited

U.S. PATENT DOCUMENTS

| | | |
|---|---|---|
| 11,457,241 B2 | 9/2022 | Ichigaya et al. |
| 2015/0016550 A1 | 1/2015 | Kim et al. |

(Continued)

FOREIGN PATENT DOCUMENTS

| | | |
|---|---|---|
| JP | 2013-223096 A | 10/2013 |
| JP | 2016-526857 A | 9/2016 |

(Continued)

OTHER PUBLICATIONS

International Search Report issued in PCT/JP2019/041254; mailed Jan. 28, 2020.
(Continued)

*Primary Examiner* — Stuart D Bennett
(74) *Attorney, Agent, or Firm* — Studebaker Brackett PLLC

(57)     ABSTRACT

An encoding device 1 includes: a transformer 13 configured to calculate an orthogonal transform coefficient by performing an orthogonal transformation process on a residual image indicating a difference between the input image and a predicted image of the input image; a quantizer 14 configured to generate quantization coefficient by quantizing the orthogonal transform coefficient based on a quantization parameter; an entropy encoder 24 configured to generate encoded data by encoding the quantization coefficient; an image decoder 10 configured to restore an orthogonal transform coefficient from the quantization coefficient based on the quantization parameter and generate a pre-filtering image by adding the predicted image to a residual image restored by performing inverse orthogonal transformation on the orthogonal transform coefficient; and a deblocking filter 18 configured to perform a filtering process on the
(Continued)

pre-filtering image and control a filtering strength depending on a result of comparison between a luminance signal level of the pre-filtering image and a luminance threshold value.

4 Claims, 4 Drawing Sheets

Related U.S. Application Data continuation of application No. 17/821,739, filed on Aug. 23, 2022, now Pat. No. 11,736,728, which is a continuation of application No. 17/237,780, filed on Apr. 22, 2021, now Pat. No. 11,457,241, which is a continuation of application No. PCT/JP2019/041254, filed on Oct. 21, 2019.

(51) Int. Cl.

| | | |
|---|---|---|
| *H04N 19/124* | (2014.01) | |
| *H04N 19/172* | (2014.01) | |
| *H04N 19/91* | (2014.01) | |

(56) References Cited

U.S. PATENT DOCUMENTS

| | | | |
|---|---|---|---|
| 2016/0366422 | A1 | 12/2016 | Yin et al. |
| 2018/0020241 | A1 | 1/2018 | Li et al. |
| 2018/0139461 | A1 | 5/2018 | Liu et al. |
| 2018/0302619 | A1* | 10/2018 | Ikeda .................... H04N 19/14 |
| 2019/0281295 | A1 | 9/2019 | Ichigaya et al. |
| 2020/0236353 | A1 | 7/2020 | Zhang et al. |
| 2022/0408112 | A1 | 12/2022 | Ichigaya et al. |
| 2023/0353784 | A1 | 11/2023 | Ichigaya et al. |

FOREIGN PATENT DOCUMENTS

| | | |
|---|---|---|
| JP | 6997339 B2 | 1/2022 |
| JP | 2023-160964 A | 11/2023 |
| WO | 2018/097299 A1 | 5/2018 |

OTHER PUBLICATIONS

Written Opinion issued in PCT/JP2019/041254; mailed Jan. 28, 2020.

Sakae Okubo (Editor-in-Chief), "Impress standard textbook series H.265/HEVC Textbook", Impress Japan, Oct. 21, 2013, pp. 161-178.

Atsuro Ichigaya et al. "CE11: Luma-Adaptive Deblocking Filter (CE11.2.2)" (Document: JVET-L0414) Joint Video Experts Team (JVET) of ITU-T SG 16 WP 3 and ISO/IEC JTC 1/SC 29/WG 11, 12th Meeting, Oct. 3-12, 2018, pp. 1-5, Macao, China.

* cited by examiner

8 LINES

8 PIXELS

BLOCK P
(VERTICAL
DIRECTION)

BLOCK Q

| p03 | p13 | p23 | p33 |
| p02 | p12 | p22 | p32 |
| p01 | p11 | p21 | p31 |
| p00 | p10 | p20 | p30 |
| q00 | q10 | q20 | q30 |
| q01 | q11 | q21 | q31 |
| q02 | q12 | q22 | q32 |
| q03 | q13 | q23 | q33 |

VERTICAL BLOCK BOUNDARY

HORIZONTAL BLOCK BOUNDARY

| p00 | p10 | p20 | p30 |
| p01 | p11 | p21 | p31 |
| p02 | p12 | p22 | p32 |
| p03 | p13 | p23 | p33 |

BLOCK P
(HORIZONTAL
DIRECTION)

LUMINANCE DEBLOCK FILTERING ENCODING DEVICE, DECODING DEVICE, AND PROGRAM

CROSS-REFERENCE TO RELATED APPLICATIONS

The present application is a continuation of U.S. patent application Ser. No. 18/344,306 filed Jun. 29, 2023, which is a continuation of U.S. patent application Ser. No. 17/821, 739 filed Aug. 23, 2022, which is a continuation of U.S. patent application Ser. No. 17/237,780 filed Apr. 22, 2021, which is based on PCT Application No. PCT/JP2019/041254, filed on Oct. 21, 2019, which claims the benefit of Japanese Patent Application No. 2018-198728 filed on Oct. 22, 2018. The content of which is incorporated by reference herein in their entirety.

TECHNICAL FIELD

The present invention relates to an encoding device, a decoding device and a program for performing a deblocking filtering process.

BACKGROUND ART

In a video encoding method represented by moving picture experts group (MPEG) which has been mainstream, for convenience in realizing real time processing, encoding (compression) is performed by using a technology of dividing a unit of a video which is called a frame (or a picture) or the like into small regions in a block form and performing transformation in a block unit, prediction, or the like. In such an encoding method, a quality difference in a block boundary caused by a difference between neighboring blocks in an encoding control becomes distortion and is perceived. In a recent encoding method such as H.264/AVC (Advanced Video Coding) or H.265/HEVC (High Efficiency Video Coding), a process which is called deblocking filtering has been adopted to reduce the encoding distortion.

Signal degradation occurs at a boundary between two neighboring blocks as a result of performing quantization of an orthogonal transform coefficient. A block distortion is caused by such signal degradation giving rise to an acute signal fluctuation in the boundary area that should be smooth due to discontinuity inherent to block-by-block processing. A deblocking filter for reducing the distortion is designed as a low-pass filter which generally attenuates fluctuation of a signal. Since a signal deterioration amount is changed depending on a roughness in quantization, a filtering strength is controlled by a quantization parameter specifying the roughness in quantization (for example, see Non Patent Literature 1).

On the other hand, as a new characteristic of video media, standardization of a high dynamic range (HDR) signal with an expanded rendering range of black and white which cannot be rendered by a video signal according to the related art, has been conducted. In comparison to a standard dynamic range (SDR) signal according to the related art, in the HDR signal, a portion with a low light intensity to a portion with a high light intensity (that is, a dark portion to a bright portion) are recorded with a limited bit depth, and thus a more drastic signal suppressing process which is called γ correction in comparison to the related art is performed. Examples of the HDR method now include the Hybrid-Log Gamma (HLG) method specified in ARIB STD-B67 and the Perceptual Quantize (PQ) method specified in SMPTE ST.2084, which are standardized as ITU-R BT.2100. It is noted that other HDR methods may be specified in the future.

Figure 1:
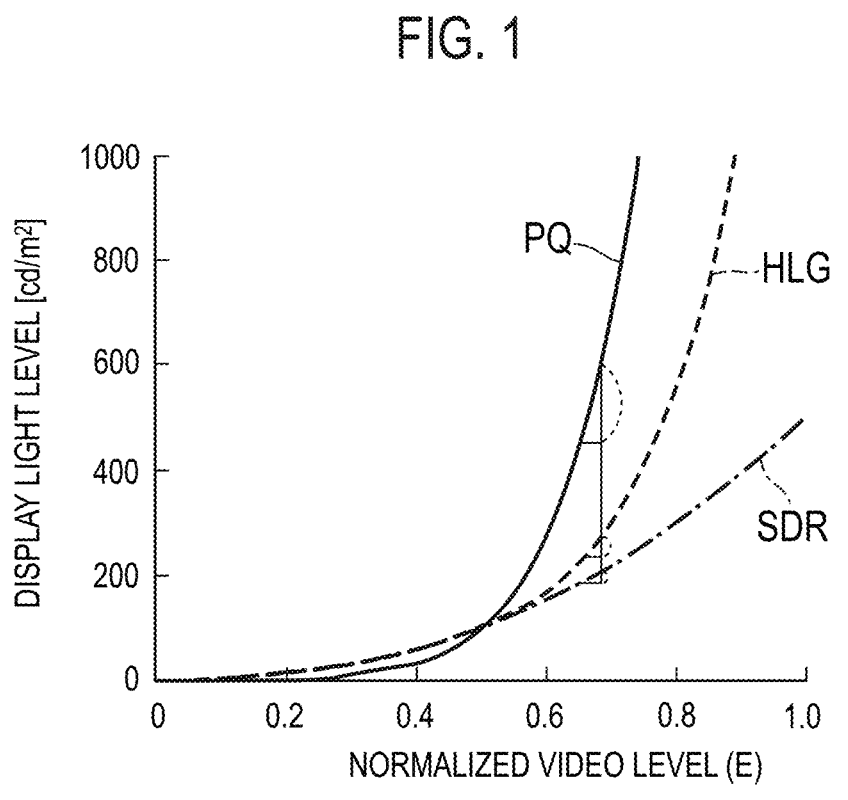

FIG. 1 illustrates a corresponding relation (inverse γ correction) between a luminance signal level of an image and a display light level at which the image is displayed on a display device, of each of an SDR signal, an HDR signal in the HLG method, and an HDR signal in the PQ method. It should be noted that the HLG method is a relative system in which a peak luminance of a display device has a maximum value, and thus a case in which the peak luminance is 2000 cd/m$^2$ is illustrated in the drawing. Similarly, the SDR signal according to the related art is also a relative system in which a peak luminance of a display device has a maximum value, and thus, a case in which a peak luminance of a currently commercially available display as an example is 500 cd/m$^2$ is illustrated.

In a case of the HDR signal, a change of the display light level (luminance) with respect to variation of the luminance signal level is larger than that of the SDR signal according to the related art. For this reason, in a region in which the signal level is high, block noise caused by a quantization distortion is exaggeratedly presented in comparison to signal deterioration according to the related art. In particular, in the PQ method with the highest degree of signal suppression, variation of the display light level depending on the luminance signal level is significant, and an influence of signal deterioration due to a block distortion is also significant. In order to reduce this phenomenon, a countermeasure of making a quantization parameter become small according to the signal level has been generally performed.

CITATION LIST

Non Patent Literature

Non Patent Literature 1
Sakae Okubo (Editor-in-Chief), "Impress standard textbook series H.265/HEVC Textbook", Impress Japan, Oct. 21, 2013.

SUMMARY OF INVENTION

In the deblocking filtering according to the related art, a threshold value for switching a strength of the filtering for smoothing between blocks is determined in advance according to a quantization parameter in a frame unit, and a control according to the light signal level is not performed. For this reason, in the case of HDR signal, a non-linearity of a difference between luminance signal levels and a difference between display light levels is high, and it is difficult for the deblocking filtering according to the related art to sufficiently reduce a block distortion. In addition, even in the case of the SDR signal according to the related art, a non-linearity is caused by gamma correction, and thus an effect of the deblocking filtering is reduced in a region with a high light level, which is problematic.

Further, as the quantization parameter becomes excessively small, an average error amount of blocks can be decreased. However, as the quantization parameter becomes small, an action of the deblocking filtering is also reduced, such that it is not possible to sufficiently solve the problem that the difference between the luminance signal levels in a boundary portion is conspicuously presented. In addition, when the quantization parameter becomes small, an amount of information is increased, and thus a compression effect is also reduced.

In view of the above, an object of the present invention is to provide an encoding device, a decoding device and a program that can reduce block distortion without decreasing compression efficiency.

To solve the above problems, an encoding device according to the present invention is the encoding device which encodes an input image, the encoding device includes: a transformer configured to calculate an orthogonal transform coefficient by performing an orthogonal transformation process on a residual image indicating a difference between the input image and a predicted image of the input image; a quantizer configured to generate quantization coefficient by quantizing the orthogonal transform coefficient based on a quantization parameter; an entropy encoder configured to generate encoded data by encoding the quantization coefficient; an image decoder configured to restore an orthogonal transform coefficient from the quantization coefficient based on the quantization parameter and generate a pre-filtering image by adding the predicted image to a residual image restored by performing inverse orthogonal transformation on the orthogonal transform coefficient; and a deblocking filter configured to perform a filtering process on the pre-filtering image, wherein the deblocking filter compares the luminance signal level of the pre-filtering image to luminance threshold values and controls the filtering strength depending on in which range the luminance signal level is.

In the encoding device, the deblocking filter is configured to determine the luminance threshold value for each picture or each sequence.

To solve the above problems, a decoding device according to the present invention is the decoding device which decodes encoded data of an input image, the decoding device includes: an entropy decoder configured to decode the encoded data and obtain a quantization coefficient generated by quantizing an orthogonal transform coefficient; an image decoder configured to restore an orthogonal transform coefficient from the quantization coefficient based on a quantization parameter and generate a pre-filtering image by adding a predicted image to a residual image restored by performing inverse orthogonal transformation on the orthogonal transform coefficient; and a deblocking filter configured to perform a filtering process on the pre-filtering image, wherein the deblocking filter compares the luminance signal level of the pre-filtering image to luminance threshold values and controls the filtering strength depending on in which range the luminance signal level is.

The decoding device according to the present invention, wherein the deblocking filter is configured to determine the luminance threshold value for each picture or each sequence.

To solve the above problems, a program according to the present invention for instructing a computer to function as the encoding device.

To solve the above problems, a program according to the present invention for instructing a computer to function as the decoding device.

According to the present invention, block distortion can be reduced without decreasing compression efficiency.

BRIEF DESCRIPTION OF DRAWINGS

FIG. 1 is a diagram illustrating a correspondence between a signal level and luminance level.

FIG. 3 is a diagram illustrating block boundaries on which a deblocking filtering process is performed.

DESCRIPTION OF EMBODIMENTS

Hereinafter, an embodiment of the present invention will be described in detail with reference to the drawings.

(Encoding Device)

Figure 2:
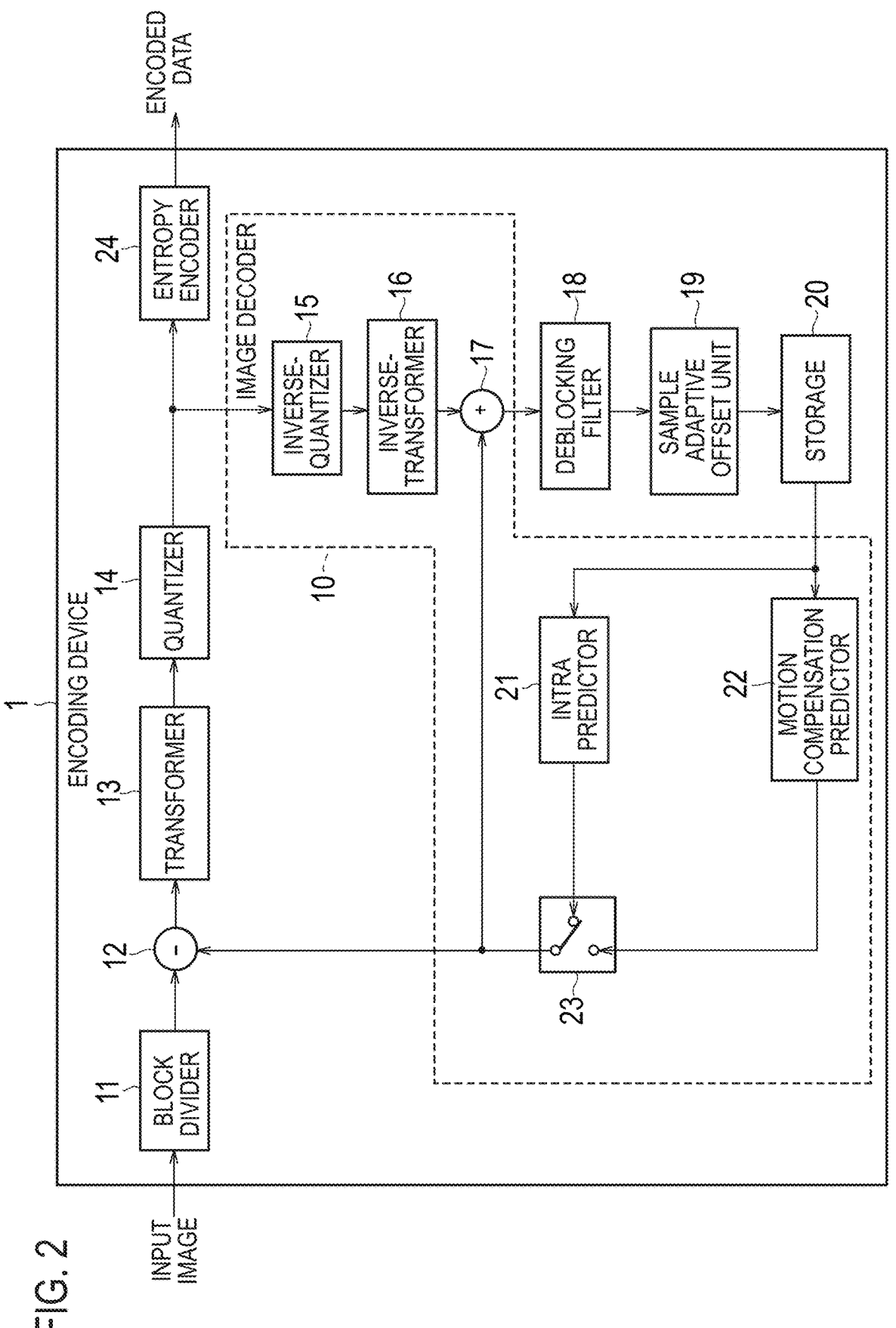
FIG. 2 is a block diagram illustrating an exemplary configuration of an encoding device according to an embodiment of the present invention.

An encoding device according to an embodiment of the present invention is described below. FIG. 2 illustrates an exemplary configuration of the encoding device according to the embodiment of the invention. The encoding device 1 illustrated in FIG. 2 includes a block divider 11, a subtractor 12, a transformer 13, a quantizer 14, an inverse-quantizer 15, an inverse-transformer 16, an adder 17, a deblocking filter 18, a sample adaptive offset unit 19, a storage 20, an intra predictor 21, a motion compensation predictor 22, a switcher 23, and an entropy encoder 24. It is noted that the sample adaptive offset unit 19 is an optional component. A processing unit that performs another post-filtering process may be provided instead of or in addition to the sample adaptive offset unit 19.

The block divider 11 divides a frame to be encoded, which is an input image, into a plurality of blocks, and outputs the block image to the subtractor 12. A size of the block may be variable, and may be, for example, 128×128 pixels, 64×64 pixels, 32×32 pixels, 16×16 pixels, 8×8 pixels, or 4×4 pixels.

The subtractor 12 subtracts each pixel value of a predicted image of the input image input from the intra predictor 21 or the motion compensation predictor 22, which is described below, via the switcher 23 from each pixel value of the block image input from the block divider 11 to generate a residual image that indicates a difference between the block image and the predicted image. The subtractor 12 outputs the residual image to the transformer 13.

The transformer 13 calculates an orthogonal transform coefficient by performing an orthogonal transformation process on the residual image input from the subtractor 12, and outputs the orthogonal transform coefficient for each block to the quantizer 14.

The quantizer 14 generates a quantization coefficient by quantizing the orthogonal transform coefficient for each block input from the transformer 13 based on a quantization parameter (Qp) specifying the roughness of quantization, and outputs the quantization parameter to the deblocking filter 18 and outputs the quantization parameter and the quantization coefficient to the inverse-quantizer 15 and the entropy encoder 24. More specifically, the quantizer 14 generates a quantization coefficient by dividing the orthogonal transform coefficient for each block input from the transformer 13 by quantization step values derived from the quantization parameter. For example, in HEVC, the value of the quantization parameter is in the range of 0 to 51, and the quantization parameter and the quantization step values are associated with each other so that when the quantization parameter is increased by 6, the quantization step values are doubled (that is, the quantization parameter is proportional to the logarithms of the quantization step values).

The inverse-quantizer 15 restores an orthogonal transform coefficient from the quantization coefficient input from the quantizer 14 based on the quantization parameter and outputs the restored orthogonal transform coefficient to the inverse-transformer 16. More specifically, the inverse-quantizer 15 restores an orthogonal transform coefficient for each block by multiplying the quantization coefficient input from the quantizer 14 by the quantization step values derived from the quantization parameter.

The inverse-transformer 16 generates a residual image by performing inverse orthogonal transformation on the orthogonal transform coefficient input from the inverse-quantizer 15, and outputs the generated residual image to the adder 17. For example, if the transformer 13 performs discrete cosine transformation, the inverse-transformer 16 performs inverse-discrete cosine transformation.

The adder 17 generates a pre-filtering image by adding each pixel value of the residual image input from the inverse-transformer 16 and each pixel value of the predicted image input from the switcher 23, and outputs the generated pre-filtering image to the deblocking filter 18.

The deblocking filter 18 performs a filtering process on the pre-filtering image input from the adder 17, and outputs the filtered image to the sample adaptive offset unit 19. The deblocking filter 18 compares the luminance signal level of the pre-filtering image to luminance threshold values and controls the filtering strength depending on in which range the luminance signal level is. Then, the deblocking filter 18 outputs information on the filtering process (including information on luminance threshold values and shift amounts a and b, which are described below, as well as filter coefficients) to the entropy encoder 24. This process will be described in detail later.

The sample adaptive offset unit 19 classifies the image input from the deblocking filter 18 in a pixel unit, adds an offset according to the classification to each pixel value, and outputs a result as a decoded image to the storage 20. In addition, the sample adaptive offset unit 19 outputs information on a sample adaptive offset to the entropy encoder 24.

The intra predictor 21 generates an intra prediction image by performing intra prediction with reference to decoded images stored in the storage 20, and outputs the generated intra prediction image to the switcher 23. The intra predictor 21 also outputs a selected intra prediction mode to the entropy encoder 24.

The motion compensation predictor 22 generates a motion vector by using a method such as block matching with reference to decoded images stored in the storage 20, and outputs a motion compensation prediction image to the switcher 23. The motion compensation predictor 22 also outputs information on the motion vector to the entropy encoder 24. In addition, the motion compensation predictor 22 generates a motion compensation prediction image based on the motion vector and outputs the generated motion compensation prediction image to the switcher 23.

The switcher 23 switches between the intra prediction image input from the intra predictor 21 and the motion compensation prediction image input from the motion compensation predictor 22, and outputs a predicted image (the intra prediction image or the motion compensation prediction image) of the decoded image to the subtractor 12 and the adder 17.

An image decoder 10 is constituted by the inverse-quantizer 15, the inverse-transformer 16, the adder 17, the intra predictor 21, the motion compensation predictor 22, and the switcher 23. The image decoder 10 generates a pre-filtering image by adding the predicted image to the residual image restored by restoring the orthogonal transform coefficient from the quantization coefficient based on the quantization parameter and performing inverse orthogonal transformation on the orthogonal transform coefficient as described above.

The entropy encoder 24 compresses data by performing entropy encoding on the quantization parameter and the quantization coefficient input from the quantizer 14, the intra prediction mode input from the intra predictor 21, the information on the predicted motion vector input from the motion compensation predictor 22, the information on the filtering process input from the deblocking filter 18, and the information on the sample adaptive offset input from the sample adaptive offset unit 19 to generate encoded data. The entropy encoder outputs the generated encoded data to the outside of the encoding device 1. In the entropy encoding, any entropy encoding method such as 0th order exponential Golomb coding and context-based adaptive binary arithmetic coding (CABAC) can be used.

(Deblocking Filtering Unit)

Next, the deblocking filter 18 will be described in detail. In the present embodiment, a size of a block on which the deblocking filter 18 performs the process is, for example, 8×8 pixels. The deblocking filter 18 first obtains a boundary strength Bs value indicating a strength of a smoothing process for each block. The Bs value is any one of 0, 1, and 2.

FIG. 3 illustrates a block boundary on which the deblocking filtering process is performed. An example of the deblocking filtering process according to the H.265/HEVC method will be described with reference to FIG. 3. In a case where a block P or Q is a block on which intra prediction is performed, the Bs value is 2. In a case where the blocks P and Q are blocks on which the intra prediction is performed, and at least one of the following conditions is satisfied, the Bs value is 1, and in other cases, the Bs value is 0.

The block P or Q includes a significant (non-zero) DCT coefficient and is a boundary of a transform unit TU (Transform Unit).

The numbers of motion vectors of the blocks P and Q or reference images are different.

An absolute value of a difference between the motion vectors of the blocks P and Q is four pixels or more.

The deblocking filter 18 does not perform the filtering process if the Bs value is 0. The following description is provided by taking a vertical block boundary illustrated in FIG. 3 as an example. If the Bs value is 1 or 2, the deblocking filter 18 performs the filtering process only when the following expression (1) holds.

[Expression 1]

$$|p2_0 - 2p1_0 + p0_0| + |p2_3 - 2p1_3 + p0_3| +$$

$$|q2_0 - 2q1_0 + q0_0| + |q2_3 - 2q1_3 + q0_3| < \beta \tag{1}$$

Further, when the filtering process is performed, the deblocking filter 18 applies strong filtering in a case where all of the following Conditional Expressions (2) to (7) are satisfied, and in other cases, applies weak filtering.

[Expression 2]

$$2(|p2_0 - 2p1_0 + p0_0| + |q2_0 - 2q1_0 + q0_0|) < \beta/4 \tag{2}$$

$$2(|p2_3 - 2p1_3 + p0_3| + |q2_3 - 2q1_3 + q0_3|) < \beta/4 \tag{3}$$

$$|p3_0 - p0_0| + |q0_0 - q3_0| < \beta/8 \tag{4}$$

-continued $$|p3_3 - p0_3| + |q0_3 - q3_3| < \beta/8 \tag{5}$$

$$|p0_0 - q0_0| < (5t_C + 1)/2 \tag{6}$$

$$|p0_3 - q0_3| < (5t_C + 1)/2 \tag{7}$$

The values of threshold values $\beta$ and $t_c$ vary depending on the average $Q_{av}$ of quantization parameters $Qp_p$ and $Qp_Q$ of neighboring blocks P and Q calculated as follows: $Q_{av}=$ (Qp$_p$+Qp$_Q$+1)>>1. In this expression, >>1 denotes a one-bit arithmetic right shift operation. The deblocking filter 18 has a reference table that indicates a correspondence between $Q_{av}$ and the threshold values $\beta$ and $t_c$. An example of the reference table is shown in Table 1. The threshold values $\beta$ and $t_c$ in a case where the bit depth of the image is 8 bits are denoted as threshold values $\beta'$ and $t_c'$, respectively. It is noted that $Q_{av}$, $\beta'$ and $t_c'$ may be adjusted by adding respective offset values for each frame or slice.

TABLE 1

| $Q_{av}$ | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| $\beta'$ | 0 | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 0 | 1 |

| $Q_{av}$ | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| $\beta'$ | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |

| $Q_{av}$ | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|
| $\beta'$ | 38 | 40 | 42 | 44 | 46 | 48 | 50 | 52 | 54 | 56 | 58 | 60 | 62 | 64 | — | — |
| $t_C'$ | 5 | 5 | 6 | 6 | 7 | 8 | 9 | 10 | 11 | 13 | 14 | 16 | 18 | 20 | 22 | 24 |

When the bit depth is B, the threshold values $\beta$ and $t_c$ are calculated by expressions (8) and (9), respectively. In these expressions, <<1 denotes a one-bit arithmetic left shift operation.

[Expression 3]

$$\beta = \beta' * (1 \ll (B - 8)) \tag{8}$$

$$t_C = t_C' * (1 \ll (B - 8)) \tag{9}$$

In the present invention, the threshold values $\beta$ and $t_c$ are set by shifting the reference table according to a luminance signal level (the pixel value of a luminance component) L. The value of the luminance signal level L may be, for example, (p0$_0$+p0$_3$+q0$_0$+q0$_3$)/4 or (p0$_0$+p0$_1$+p0$_2$+p0$_3$+q0$_0$+q0$_1$+q0$_2$+q0$_3$)/8. It is noted that this is merely an example of determining the luminance signal level L, and the present invention is not limited thereto.

In particular, the deblocking filter 18 determines reference table shift amounts by determining threshold values for the luminance signal level L (luminance threshold values) and comparing the luminance signal level L to the luminance threshold values. The deblocking filter 18 can determine the luminance threshold values for each picture, and therefore may determine the luminance threshold values at any pictures, every certain number of pictures, or at predetermined pictures (e.g., for each sequence of pictures or at I pictures).

The luminance signal level can be divided into any number of steps (i.e., any number of ranges of the luminance signal level can be defined) by the luminance threshold values and these ranges of the luminance signal level can be defined uniformly or non-uniformly as desired. For example, the luminance threshold values are set to luminance signal levels at which the gradient of an electro-optical transfer function is equal to predetermined values (e.g., ¼, ½, 2, 4 and 8). Alternatively, the luminance threshold values may be determined by analyzing the relation between the luminance signal level and the block distortion level. For example, if the relation between the luminance signal level (1-254) of an 8-bit video and the block distortion level is approximately linear and the luminance signal level is divided into five steps, the luminance threshold values may be set to 50, 100, 150 and 200. In this case, the ranges of the luminance signal level may be 0-49, 50-99, 100-149, 150-199 and 200-254. If the change rate of the block distortion level is high in a certain range of the luminance signal level, the range of the luminance signal level may be divided smaller than the other ranges.

In particular, the deblocking filter 18 uses $Q_{AV}$ as an index of $\beta'$ and $t_c'$ as shown in Table 1 to obtain $\beta'[Q_{AV}]$ and $t_c'[Q_{AV}]$, and controls the index $Q_{AV}$ depending on the luminance signal level L. For example, a shift amount a is determined by the criteria of expression (10) and a shift amount b is determined by the criteria of expression (11). In these expressions, th1 to th6 are luminance threshold values. The shift amounts a and b may be determined according to the requirements of each application, or simply, the shift amounts a and b may be equal, i.e., a=b. Alternatively, the shift amount a or b may be set to 0, i.e., a=0 or b=0 so that one of the threshold values $\beta'$ and $t_c'$ can be shifted. The shift amount a and b can be considered to be filtering strength control information.

$$\text{if } (L < th1) \tag{10}$$
$$a = -1;$$
$$\text{else if } (L >= th1 \&\& L < th2)$$
$$a = 0;$$
$$\text{else if } (L >= th2 \&\& L < th3)$$
$$a = 1;$$
$$\text{else if } (L >= th3 \&\& L < th4)$$
$$a = 5;$$
$$\text{else if } (L >= th4 \&\& L < th5)$$
$$a = 10;$$

-continued else if $(L \geq th5 \ \&\& \ L < th6)$ $a = 12;$ else if $(L \geq th6)$ $a = 15;$ if $(L < th1)$           (11)

$b = -1;$ else if $(L \geq th1 \ \&\& \ L < th3)$ $b = 0;$ else if $(L \geq th3 \ \&\& \ L < th4)$ $b = 1;$ else if $(L \geq th4 \ \&\& \ L < th6)$ $b = 5;$ else if $(L \geq th6)$ $b = 7;$ For example, when the shift amounts a and b satisfy a=b=qpOffset, the index $Q_{AV}$ is calculated as follows: $Q_{AV}=(Qp_P+Qp_Q+1)\!>\!>1+$qpOffset, and thus the index $Q_{AV}$ depending on the luminance level L can be used. For instance, when qpOffset=5, the threshold values β' and $t_c'$ are determined with reference to the reference table by using $Q_{AV}$ plus an offset of +5 as an index. That is, the threshold values β' and $t_c'$ is shifted to the right by 5 as compared to the threshold values β' and $t_c'$ without any offset. When qpOffset is negative, the threshold values β' and $t_c'$ are shifted to the left. When the threshold values β' and $t_c'$ reach 0, the threshold values β' and $t_c'$ remain at the lower limit of 0 even if the threshold values β' and $t_c'$ are further shifted to the left, and when the threshold values β' and $t_c'$ reach respective upper limits of 64 and 24, the threshold values β' and $t_c'$ are set to the upper limits even if the threshold values β' and $t_c'$ are further shifted to the right. In the above example, the shift amounts a and b are equal, i.e., a=b. If the shift amounts a and b are not equal, the threshold values β' and $t_c'$ are calculated by using $Q_{AV}$ that is provided for each of the threshold values β' and $t_c'$.

The deblocking filter 18 can adaptively control threshold values for switching filtering strengths depending on $Q_{av}$ by shifting the threshold values β' and $t_c'$ in the reference table according to the shift amount a and b specified depending on the luminance signal level L. When the threshold values β' and $t_c'$ in the reference table are shifted to the right ($Q_{AV}$ plus a positive offset is used as an index), the threshold values β and $t_c$ are increased, and thus conditional expressions (2) to (7) above are more easily satisfied and the possibility of applying strong filtering becomes higher. Accordingly, in the encoding device 1 according to the present invention, a suitable filtering strength can be selected for content by increasing the shift amounts a and b for a group of images having a high block distortion level to enhance the possibility of applying high-strength filtering, and by decreasing the shift amounts a and b to less than zero for a group of images having a low block distortion level to reduce the possibility of applying high-strength filtering. Consequently, the occurrence of block distortion can be suppressed without decreasing compression efficiency and image quality can be improved as compared to the related art. When the shift amounts a and b are negative, before transmission, an offset may be added to increase the shift amounts a and b to zero or greater. This makes it possible to remove the sign bit that indicates whether the number is positive or negative.

Information indicating the luminance threshold values determined by the deblocking filter 18 and the shift amount a and b specified for each range of the luminance signal level are transmitted by the entropy encoder 24. For example, in the HEVC method, such information can be transmitted by the entropy encoder 24 as a parameter set for each picture called a picture parameter set (PPS) or a parameter set for each sequence called a sequence parameter set (SPS). At the same time, an enable flag indicating whether the aforementioned shift for the reference table is performed or not may also be transmitted by the entropy encoder 24.

The information indicating the luminance threshold values may not include the luminance threshold values themselves but may include the number of ranges of the luminance signal level defined by the luminance threshold values and differences between neighboring luminance threshold values. For example, when the luminance threshold values th1 to th4 for the luminance signal level are set as follows: th1=40, th2=90, th3=150 and th4=200, the number of ranges of the luminance signal level is five. Differences between neighboring luminance threshold values are th1-0=40, th2-th1=50, th3-th2=60, and th4-th3=50. The lowest luminance signal level is used as a neighboring luminance threshold value of th1. In this example, the lowest luminance signal level is 0. Because the number of ranges of the luminance signal level is two or more, the actual number of ranges of the luminance signal level minus two, i.e., three, in this example, may be transmitted. Similarly, because differences between neighboring luminance threshold values are equal to or more than one, actual differences between neighboring luminance threshold values minus one, i.e., 39, 49, 59 and 49, in this example, may be transmitted. Transmitting as small values as possible can reduce the code amount needed.

It should be noted that it is possible to suitably use a computer that functions as the encoding device 1 described above, and the computer can be implemented in a manner in which a program, in which contents of a process for realizing each function of the encoding device 1 is described, is stored in a storage of the computer, and the program is read and executed by a central processing unit (CPU) of the computer. It should be noted that the program can be recorded in a computer-readable recording medium.

(Decoding Device)

Figure 4:
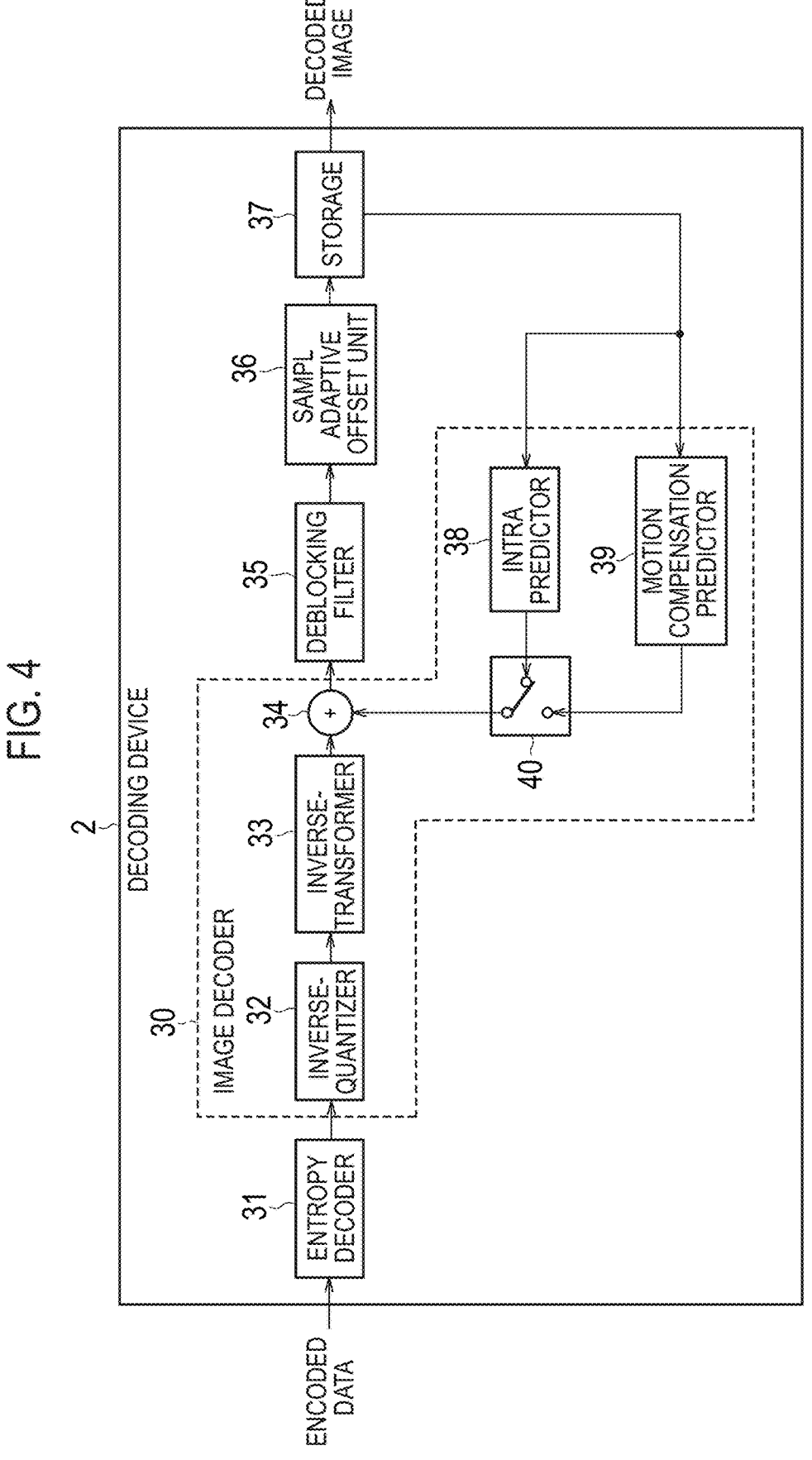
FIG. 4 is a block diagram illustrating an exemplary configuration of a decoding device according to an embodiment of the present invention.

Next, a decoding device according to an embodiment of the present invention will be described. FIG. 4 is a block diagram illustrating an example of a configuration of the decoding device according to an embodiment. A decoding device 2 illustrated in FIG. 4 includes an entropy decoder 31, an inverse-quantizer 32, an inverse-transformer 33, an adder 34, a deblocking filter 35, a sample adaptive offset unit 36, a storage 37, an intra predictor 38, a motion compensation predictor 39, and a switcher 40. The decoding device 2 decodes encoded data of an input image, which are encoded by the encoding device 1.

The entropy decoder 31 decodes the encoded data output from the encoding device 1, and obtains a quantization parameter, a quantization coefficient, an intra prediction mode, motion prediction information, information on filtering, and information on a sample adaptive offset. Then, the entropy decoder 31 outputs the quantization parameter and the quantization coefficient to the inverse-quantizer 32, outputs the intra prediction mode to the intra predictor 38, outputs the motion prediction information to the motion compensation predictor 39, outputs the quantization parameter and the information on filtering to the deblocking filter 35, and outputs the information on the sample adaptive offset to the sample adaptive offset unit 36.

The inverse-quantizer 32 receives as input the quantization coefficient and the quantization parameter from the entropy decoder 31, restores an orthogonal transform coefficient for each block by multiplying the quantization coefficient by quantization step values derived from the quantization parameter, and outputs the orthogonal transform coefficient to the inverse-transformer 33.

The inverse-transformer 33 generates a residual image by performing inverse transformation on the orthogonal transform coefficient input from the inverse-quantizer 32, and outputs the generated residual image to the adder 34.

The adder 34 generates a pre-filtering image by adding each pixel value of the residual image input from the inverse-transformer 33 and each pixel value of the predicted image input from the switcher 40, and outputs the generated pre-filtering image to the deblocking filter 35.

The deblocking filter 35 performs a filtering process on the pre-filtering image input from the adder 34, and outputs the filtered image to the sample adaptive offset unit 36. The deblocking filter 35 compares the luminance signal level of the pre-filtering image to luminance threshold values and controls the filtering strength depending on in which range the luminance signal level is. In particular, the deblocking filter 35 obtains luminance threshold values for each picture or sequence and increases the filtering strength for a group of images having a high block distortion level.

The sample adaptive offset unit 36 adds an offset to the image input from the deblocking filter 35 according to the information on the sample adaptive offset input from the entropy decoder 31, and outputs a result as a decoded image to the storage 37.

The storage 37 stores images for one frame and outputs the images for one frame to the outside of the decoding device 2.

The intra predictor 38 generates an intra prediction image by performing a prediction process according to the intra prediction mode input from the entropy decoder 31 with reference to decoded images stored in the storage 37, and outputs the intra prediction image to the switcher 40.

The motion compensation predictor 39 generates a motion compensation prediction image by performing a prediction process according to the information on the motion vector input from the entropy decoder 31 with reference to decoded images stored in the storage 37, and outputs the motion compensation prediction image to the switcher 40.

The switcher 40 switches between the intra prediction image input from the intra predictor 38 and the motion compensation prediction image input from the motion compensation predictor 39, and outputs the prediction image (the intra prediction image or the motion compensation prediction image) to the adder 34.

The image decoder 30 is constituted by the inverse-quantizer 32, the inverse-transformer 33, the adder 34, the intra predictor 38, the motion compensation predictor 39, and the switcher 40. As described above, the image decoder 30 generates the pre-filtering image by restoring the orthogonal transform coefficient from the quantization coefficient based on the quantization parameter and adding the predicted image of the decoded image to the residual image restored by performing the inverse orthogonal transformation on the orthogonal transform coefficient.

The process performed by the deblocking filter 35 is the same as that performed by the deblocking filter 18. The deblocking filter 35 calculates a boundary strength Bs value for each block. If the Bs value is 0, the deblocking filter 35 does not perform a filtering process and if the Bs value is 1 or 2, the deblocking filter 35 performs a filtering process only when the above expression (1) holds. When a filtering process is performed, if all the conditional expressions (2) to (7) hold, strong filtering is applied. Otherwise, weak filtering is applied. The deblocking filter 35 obtains luminance threshold values and shift amounts a and b from the entropy decoder 31. If the deblocking filter 35 obtains information on differences between neighboring luminance threshold values from the entropy decoder 31, the deblocking filter 35 determines luminance threshold values from the obtained information. For example, if the differences between neighboring luminance threshold values are 40, 50, 60 and 50 and if the lowest luminance signal level is 0, the luminance threshold values th1 to th4 can be calculated as follows: th1=0+40=40, th2=th1+50=90, th3=th2+60=150, and th4=th3+50=200. As with the deblocking filter 18, the deblocking filter 35 can adaptively control threshold values for switching filtering strengths according to $Q_{av}$ by shifting the threshold values $\beta'$ and $t_c'$ in the reference table according to the shift amounts a and b obtained by comparing the luminance signal level L and the luminance threshold values ($Q_{AV}$ plus an offset is used as an index).

When the threshold values $\beta'$ and $t_c'$ in the reference table are shifted to the right, the threshold values $\beta$ and $t_c$ are increased, and thus conditional expressions (2) to (7) above are more easily satisfied and the possibility of applying strong filtering becomes higher. Accordingly, in the decoding device 2 according to the present invention, a suitable filtering strength can be selected for content by increasing the shift amounts a and b for a group of images having a high block distortion level to enhance the possibility of applying high-strength filtering, and by decreasing the shift amounts a and b to less than zero for a group of images having a low block distortion level to reduce the possibility of applying high-strength filtering. Consequently, the occurrence of block distortion can be suppressed without decreasing compression efficiency and image quality can be improved as compared to the related art.

It should be noted that it is possible to suitably use a computer that functions as the decoding device 2 described above. The computer can be implemented in a manner in which a program, in which contents of a process for realizing each function of the decoding device 2 is described, is stored in a storage of the computer, and the program is read and executed by a central processing unit (CPU) of the computer. It should be noted that the program can be recorded in a computer-readable recording medium.

Although the above embodiments have been described as representative examples, it will be obvious to those skilled in the art that many modifications and substitutions can be made without departing from the spirit and scope of the present invention. Therefore, the present invention should not be construed as being limited by the above-described embodiments, and various modifications and changes are possible without departing from the scope of the claims. For example, it is possible to combine a plurality of component blocks described in the configuration diagram of the embodiment into one, or to divide one component block.

The invention claimed is:

1. An encoding device which encodes an input image comprising:

a transformer configured to calculate a transform coefficient by performing a transformation process on a residual image indicating a difference between the input image and a predicted image of the input image;

a quantizer configured to generate quantization coefficient by quantizing the transform coefficient based on a quantization parameter;

an entropy encoder configured to generate encoded data by encoding the quantization coefficient;

an image decoder configured to restore a transform coefficient from the quantization coefficient based on the quantization parameter and generate a pre-filtering image by adding the predicted image to a residual image restored by performing inverse transformation on the transform coefficient; and a deblocking filter configured to perform a filtering process on the pre-filtering image, wherein the deblocking filter is configured to control a filtering strength depending on a result of comparison between a luminance signal level of the pre-filtering image and a luminance threshold value, the deblocking filter is configured to calculate the luminance signal level of the pre-filtering image by averaging pixel values of a plurality of pixels in a boundary area of a pair of neighboring blocks corresponding to the pre-filtering image, and the deblocking filter is configured to determine the luminance threshold value for each sequence.

2. A decoding device which decodes encoded data of an input image comprising:

an entropy decoder configured to decode the encoded data and obtain a quantization coefficient generated by quantizing a transform coefficient;

an image decoder configured to restore a transform coefficient from the quantization coefficient based on a quantization parameter and generate a pre-filtering image by adding a predicted image to a residual image restored by performing inverse transformation on the transform coefficient; and a deblocking filter configured to perform a filtering process on the pre-filtering image, wherein the deblocking filter is configured to control a filtering strength depending on a result of comparison between a luminance signal level of the pre-filtering image and a luminance threshold value, the deblocking filter is configured to calculate the luminance signal level of the pre-filtering image by averaging pixel values of a plurality of pixels in a boundary area of a pair of neighboring blocks corresponding to the pre-filtering image, and the deblocking filter is configured to determine the luminance threshold value for each sequence.

3. An image encoding method for encoding an input image, the image encoding method comprising:

calculating a transform coefficient by performing a transformation process on a residual image indicating a difference between the input image and a predicted image of the input image;

generating quantization coefficient by quantizing the transform coefficient based on a quantization parameter;

generating encoded data by encoding the quantization coefficient;

restoring a transform coefficient from the quantization coefficient based on the quantization parameter and generate a pre-filtering image by adding the predicted image to a residual image restored by performing inverse transformation on the transform coefficient;

performing a filtering process on the pre-filtering image, wherein the performing the filtering process comprises:

calculating a luminance signal level of the pre-filtering image by averaging pixel values of a plurality of pixels in a boundary area of a pair of neighboring blocks corresponding to the pre-filtering image, and controlling a filtering strength depending on a result of comparison between the luminance signal level of the pre-filtering image and a luminance threshold value, wherein the luminance threshold value is determined for each picture.

4. An image decoding method for decoding encoded data of an input image, the image decoding method comprising:

decoding the encoded data and obtain a quantization coefficient generated by quantizing a transform coefficient;

restoring a transform coefficient from the quantization coefficient based on a quantization parameter and generate a pre-filtering image by adding a predicted image to a residual image restored by performing inverse transformation on the transform coefficient; and performing a filtering process on the pre-filtering image, wherein the filtering process comprises controlling a filtering strength depending on a result of comparison between a luminance signal level of the pre-filtering image and a luminance threshold value, and calculating the luminance signal level of the pre-filtering image by averaging pixel values of a plurality of pixels in a boundary area of a pair of neighboring blocks corresponding to the pre-filtering image, wherein the luminance threshold value is determined for each sequence.

* * * * *